(12) United States Patent
Nelson et al.

(10) Patent No.: US 11,187,312 B2
(45) Date of Patent: Nov. 30, 2021

(54) TORQUE CONVERTER WITH STACKED PLATE FOUR-PASS CLUTCH

(71) Applicant: Schaeffler Technologies AG & Co. KG, Herzogenaurach (DE)

(72) Inventors: Kyle Nelson, Dover, OH (US); Victor Norwich, Wooster, OH (US); Justin Persinger, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 92 days.

(21) Appl. No.: 16/439,759

(22) Filed: Jun. 13, 2019

(65) Prior Publication Data

US 2020/0393029 A1 Dec. 17, 2020

(51) Int. Cl.
*F16H 45/02* (2006.01)
*F16F 15/123* (2006.01)
*F16D 25/0635* (2006.01)

(52) U.S. Cl.
CPC ......... *F16H 45/02* (2013.01); *F16D 25/0635* (2013.01); *F16F 15/123* (2013.01); *F16H 2045/021* (2013.01); *F16H 2045/0278* (2013.01)

(58) Field of Classification Search
CPC ............. F16H 45/02; F16H 2045/0278; F16H 2045/021; F16F 15/123; F16D 25/0635
See application file for complete search history.

(56) References Cited

U.S. PATENT DOCUMENTS

| | | | |
|---|---|---|---|
| 9,188,212 B2 | 11/2015 | Vanni et al. | |
| 10,030,713 B2* | 7/2018 | Matsuda | F16H 45/02 |
| 2005/0056512 A1* | 3/2005 | Sasse | F16H 45/02 |
| | | | 192/3.3 |
| 2011/0120829 A1 | 5/2011 | Vanni et al. | |
| 2016/0017971 A1 | 1/2016 | Sayre et al. | |
| 2016/0169358 A1 | 6/2016 | Kawahara et al. | |
| 2018/0163837 A1* | 6/2018 | Sato | F16H 41/24 |
| 2019/0136951 A1 | 5/2019 | Vanni et al. | |

FOREIGN PATENT DOCUMENTS

KR 1020190024427 A 3/2019

* cited by examiner

*Primary Examiner* — David J Hlavka

(57) ABSTRACT

A torque converter, including: a cover arranged to receive torque; an impeller including an impeller shell fixed to the cover; a turbine including a turbine shell; a stator including at least one stator blade axially disposed between the impeller shell and the turbine shell; and a lock-up clutch. The lock-up clutch includes: a piston plate non-rotatably connected to the cover; a dam plate; a centering plate axially disposed between the cover and the dam plate; a first chamber bounded at least in part by the cover and the piston plate; a second chamber bounded at least in part by the piston plate and the dam plate; a first channel connected to the first chamber and bounded at least in part by the cover and the centering plate; and a second channel connected to the second chamber and bounded at least in part by the centering plate and the dam plate.

16 Claims, 7 Drawing Sheets

TORQUE CONVERTER WITH STACKED PLATE FOUR-PASS CLUTCH

TECHNICAL FIELD

The present disclosure relates to a four-pass torque converter with stacked plates forming at least portions of chambers for a lock-up clutch and at least portions of channels for transmitting fluid to and from the chambers.

BACKGROUND

Known four-pass torque converters use monolithic hubs with drilled passages, sometimes overlapping axially, to transmit fluid to and from chambers for a lockup clutch.

SUMMARY

According to aspects illustrated herein, there is provided a torque converter, including: a cover arranged to receive torque; an impeller including an impeller shell fixed to the cover, and at least one impeller blade fixed to the impeller shell; a turbine including a turbine shell, and at least one turbine blade fixed to the turbine shell; a stator including at least one stator blade axially disposed between the impeller shell and the turbine shell; and a lock-up clutch. The lock-up clutch includes: a piston plate non-rotatably connected to the cover; a dam plate; a centering plate axially disposed between the cover and the dam plate; a first chamber bounded at least in part by the cover and the piston plate; a second chamber bounded at least in part by the piston plate and the dam plate; a first channel connected to the first chamber and bounded at least in part by the cover and the centering plate; and at least one second channel connected to the second chamber and bounded at least in part by the centering plate and the dam plate.

According to aspects illustrated herein, there is provided a method of operating a lock-up clutch for a torque converter. The torque converter includes: a cover; an impeller including an impeller shell fixed to the cover and at least one impeller blade fixed to the impeller shell; a turbine including a turbine shell and at least one turbine blade fixed to the turbine shell; a stator including at least one stator blade axially disposed between the impeller shell and the turbine shell; and a component arranged to be non-rotatably connected to an input shaft of a transmission. The method includes: receiving torque on the cover; transmitting a first pressurized fluid radially outwardly through a first channel bounded at least in part by the cover and a first side of a centering plate non-rotatably connected to the cover, the first side facing in a first axial direction; transmitting the first pressurized fluid into a first chamber bounded at least in part by the cover and a piston plate of a lockup clutch of the torque converter; transmitting a second pressurized fluid radially outwardly through a second channel between a second side of the centering plate and a dam plate non-rotatably connected to the centering plate, the second side facing in a second axial direction opposite the first axial direction; transmitting the second pressurized fluid into a second chamber bounded at least in part by the piston plate and the dam plate; displacing, with the first pressurized fluid, the piston plate in the second axial direction; and non-rotatably connecting the piston plate to the component.

According to aspects illustrated herein, there is provided a torque converter, including: a cover arranged to receive torque; an impeller including an impeller shell fixed to the cover, and at least one impeller blade fixed to the impeller shell; a turbine including a turbine shell, and at least one turbine blade fixed to the turbine shell; a stator including at least one stator blade axially disposed between the impeller shell and the turbine shell; a torsional vibration damper arranged to be non-rotatably connected to an input shaft of a transmission, and including an input plate; and a lock-up clutch. The lock-up clutch includes: a piston plate non-rotatably connected to the cover; a dam plate free of a through-bore passing through the dam plate with an exception of a central opening of the dam plate through which an axis of rotation of the torque converter passes; a centering plate axially disposed between the cover and the dam plate, and, with an exception of a central opening of the centering plate through which an axis of rotation of the torque converter passes, free of a through-bore passing through the centering plate; a first chamber bounded at least in part by the cover and the piston plate; a second chamber bounded at least in part by the piston plate and the dam plate; a first channel connected to the first chamber and bounded at least in part by the cover and a first side of the centering plate; and a second channel connected to the second chamber and bounded at least in part by the dam plate and a second side of the centering plate. The first channel is arranged to transmit first pressurized fluid to the first chamber to axially displace the piston plate to non-rotatably connect the piston plate and the input plate of the torsional vibration damper.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
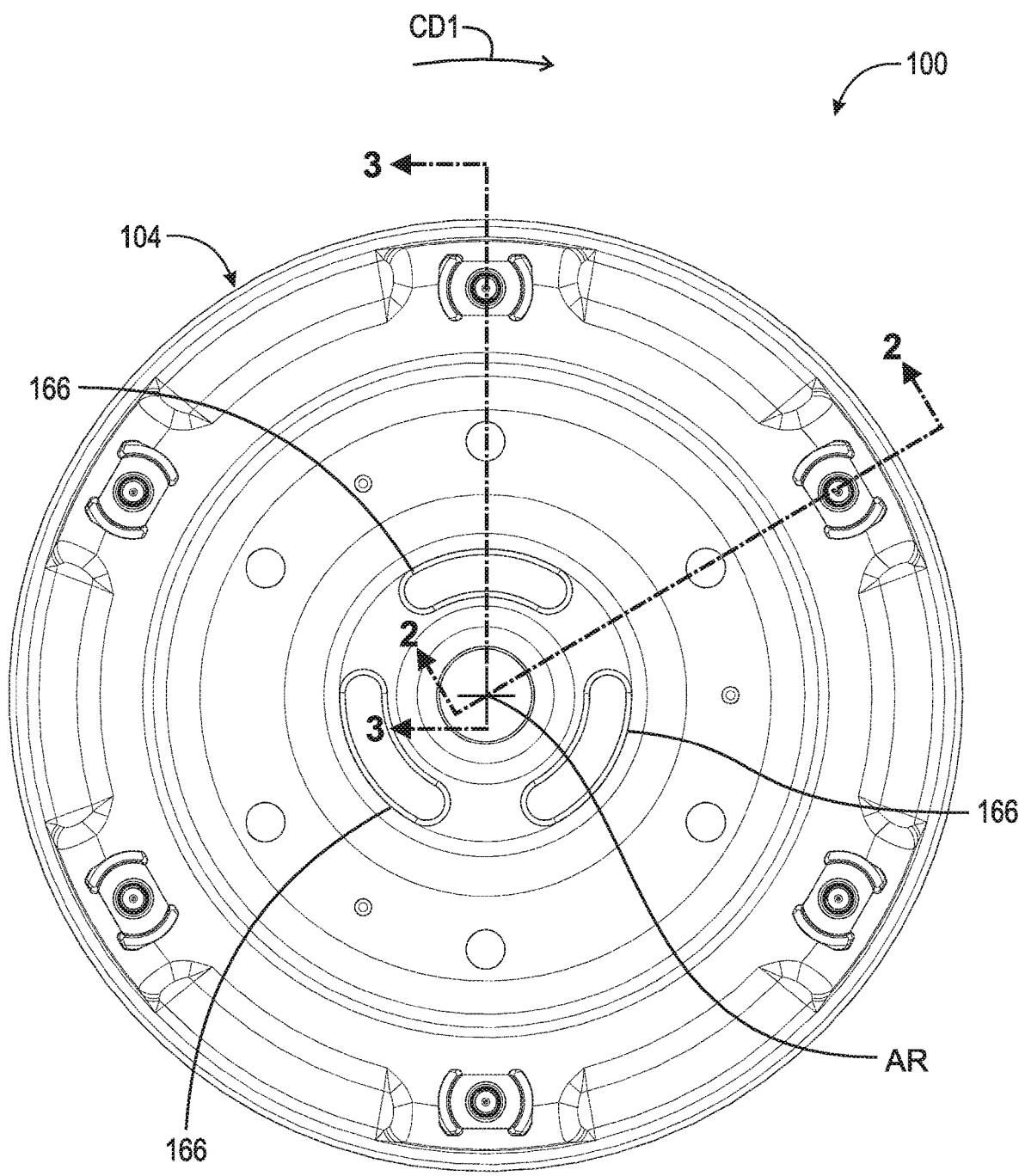
FIG. 1 is a front view of a torque converter with a stacked plate four pass clutch.

FIG. 1 is a front view of torque converter 100 with a stacked plate four pass clutch.

Figure 2:
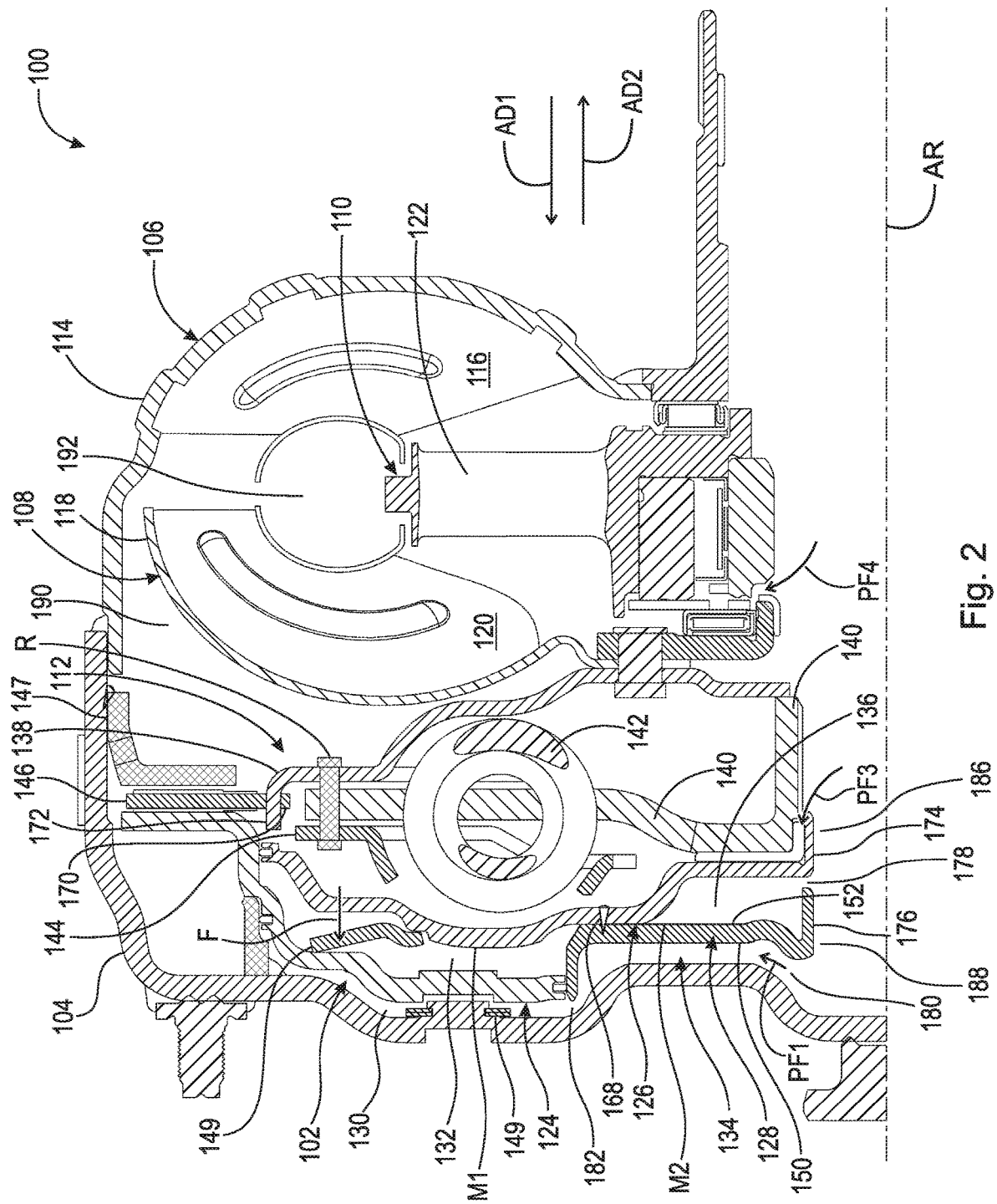
FIG. 2 is a cross-sectional view along line 2-2 in FIG. 1.

FIG. 2 is a cross-sectional view along line 2-2 in FIG. 1.

Figure 3:
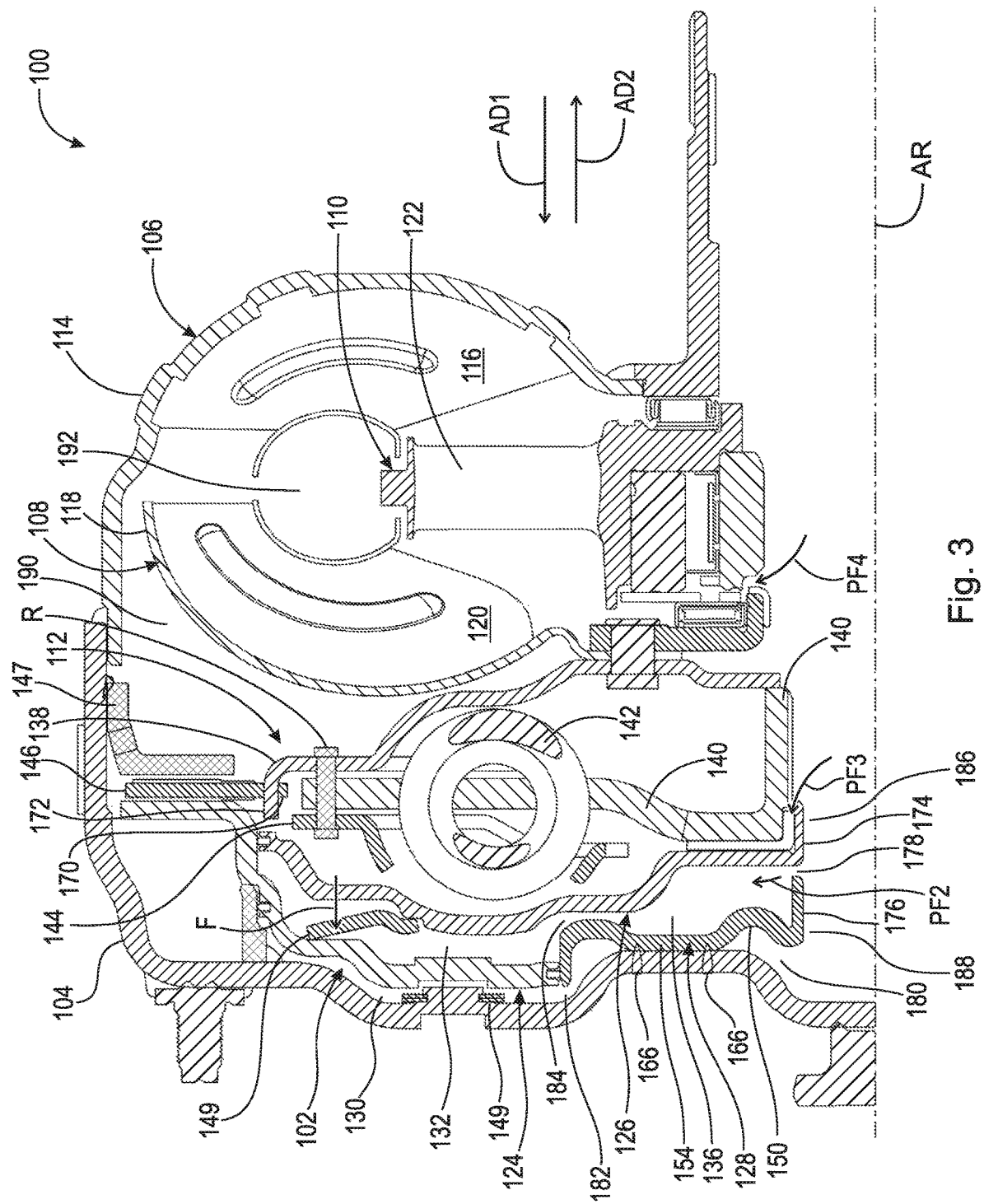
FIG. 3 is a cross-sectional view along line 3-3 in FIG. 1.

FIG. 3 is a cross-sectional view along line 3-3 in FIG. 1. The following should be viewed in light of FIGS. 1 through 3. Stacked plate four pass torque converter 100 includes: lock-up clutch 102; cover 104 arranged to receive torque; impeller 106; turbine 108; stator 110; and component 112. Impeller 106 includes impeller shell 114 fixed to cover 104 and at least one impeller blade 116 fixed to impeller shell 114. Turbine 108 includes turbine shell 118 and at least one turbine blade 120 fixed to turbine shell 118. Stator 110 includes at least one stator blade 122 axially disposed between impeller shell 114 and turbine shell 118. Component 112 is arranged to be non-rotatably connected to an input shaft (not shown) of a transmission (not shown). In an example embodiment, component 112 is a torsional vibration damper.

Lock-up clutch 102 includes: piston plate 124 non-rotatably connected to cover 104; dam plate 126; centering plate 128 axially disposed between cover 104 and dam plate 126; chamber 130 bounded at least in part by cover 104 and piston plate 124; chamber 132 bounded at least in part by piston plate 124 and dam plate 126; channel 134 connected to chamber 130 and bounded at least in part by cover 104 and centering plate 128; and channel 136 connected to chamber 132 and bounded at least in part by centering plate 128 and dam plate 126.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

In an example embodiment, torsional vibration damper 112 includes: input plate 138; output flange 140 arranged to non-rotatably connect to the input shaft; at least one spring 142 engaged with input plate 138 and output flange 140; and cover plate 144 engaged with springs 142 and non-rotatably connected to input plate 138, for example by rivets R. In an example embodiment, clutch 102 includes clutch plate 146 non-rotatably connected to input plate 138, and reaction plate 147 fixed to cover 104. Channel 134 is arranged to transmit pressurized fluid PF1 to chamber 130 to axially displace piston plate 124 to non-rotatably connect piston plate 124, input plate 138, clutch plate 146, and reaction plate 147 for a lock-up mode of torque converter 100.

In the example of FIG. 1, torque converter 100 includes: leaf springs 148 connecting piston plate 124 to cover 104; and resilient element 149, for example a Belleville washer. Resilient element 149 is in contact with dam plate 126 and piston plate 124 and urges piston plate 124 in axial direction AD1 with force F. Leaf springs 148 enable piston plate 124 to axially displace with respect to cover 104 while remaining rotationally fixed to cover 104. Thus, for the lock-up mode, fluid PF1 overcomes force F, and piston plate 124 displaces in direction AD2, opposite axial direction AD1. For a torque converter mode of torque converter 100, fluid PF1 is drained from chamber 130 or de-pressurized in chamber 130 such that force F is able to displace piston plate 124 in direction AD1 and disengage piston plate 124 from clutch plate 146. In an example embodiment (not shown), torque converter 100 does not include resilient element 149.

Centering plate 128 includes: side 150, at least a portion of which is facing in axial direction AD1; and side 152, at least a portion of which is facing in axial direction AD2. No portion of channel 136 is bounded by side 150, and no portion of channel 134 is bounded by side 152.

Figure 4:
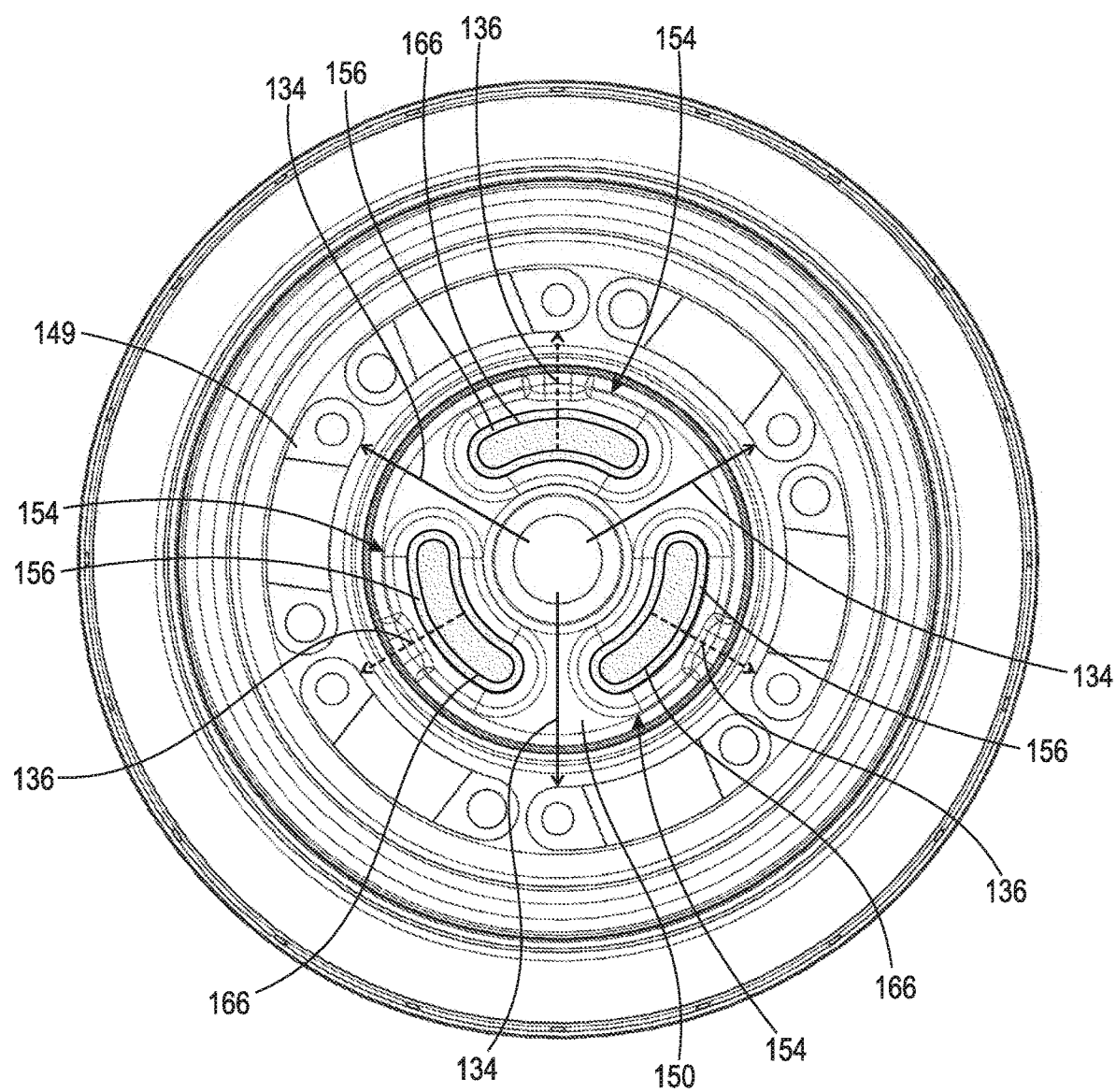
FIG. 4 is a front view of the torque converter shown in FIG. 1 with a cover removed.

FIG. 4 is a front view of torque converter 100 shown in FIG. 1 with cover 104 removed.

Figure 5:
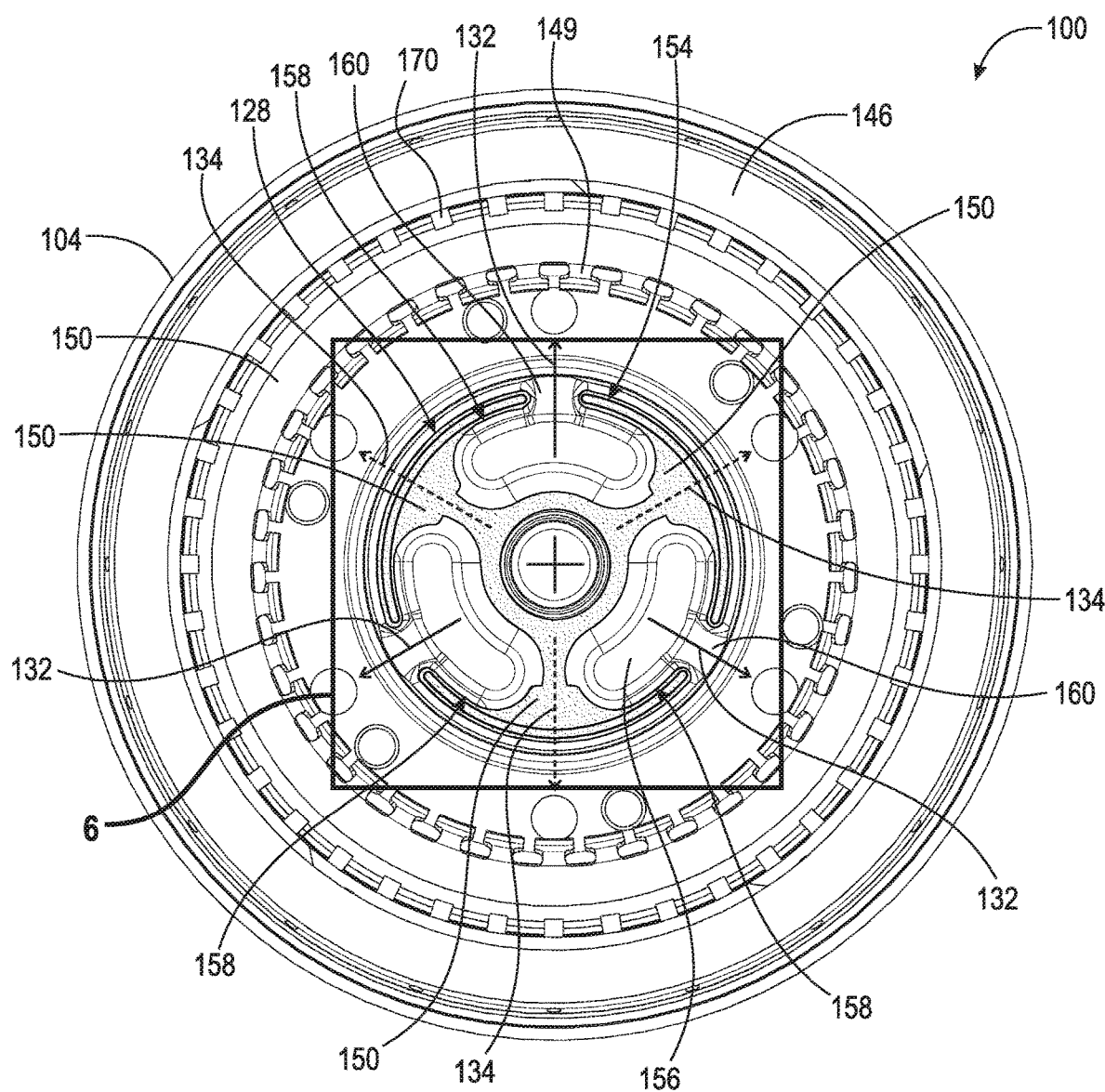
FIG. 5 is the back view of a centering plate, a piston plate, a resilient element, a clutch plate, and the cover of the torque converter shown in FIG. 1.

FIG. 5 is a back view of centering plate 128, piston plate 124, resilient element 149, clutch plate 146, and cover 104 of torque converter 100 shown in FIG. 1.

Figure 6:
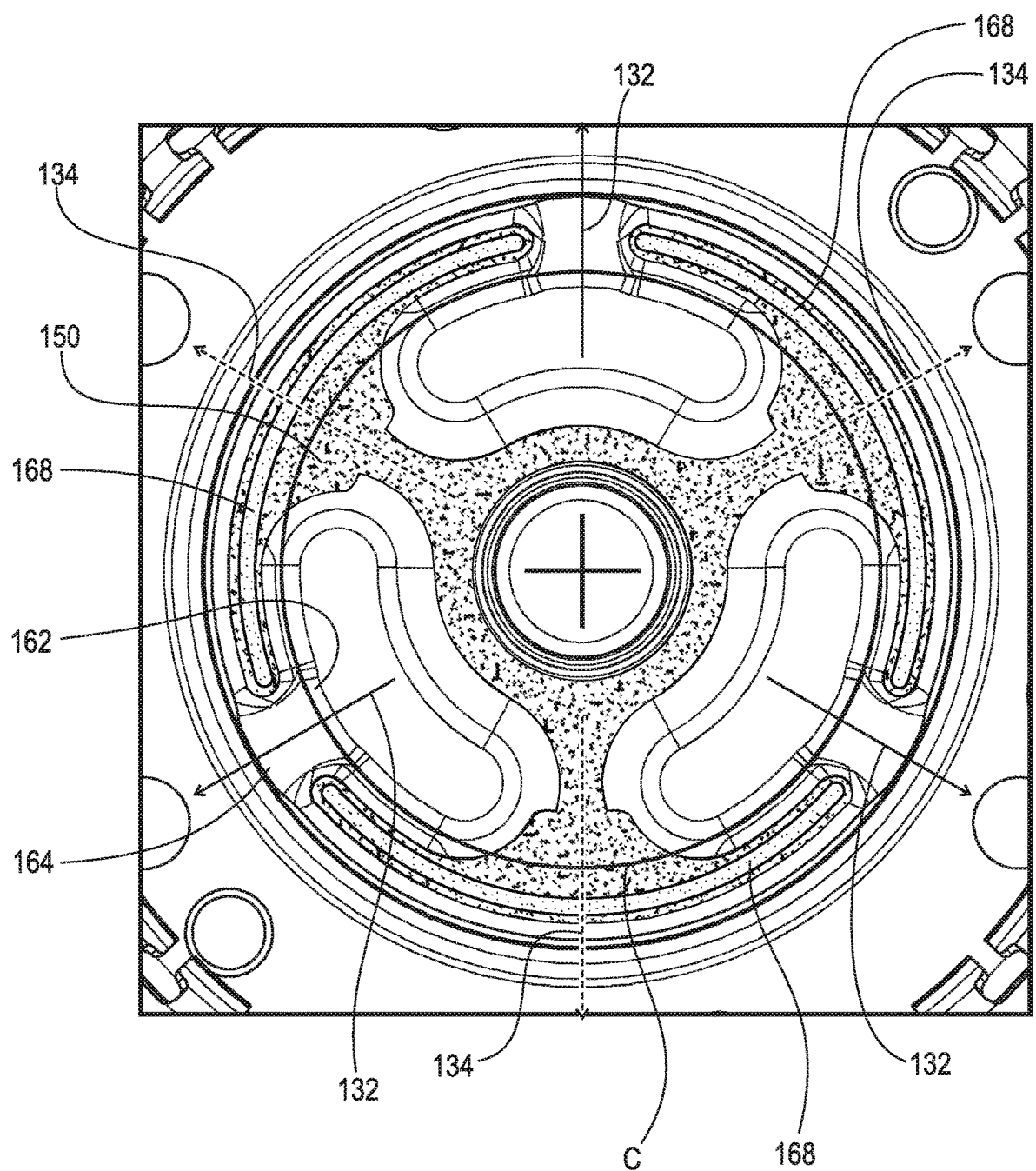
FIG. 6 is a detail of area 6 in FIG. 5.

FIG. 6 is a detail of area 6 in FIG. 5.

Figure 7:
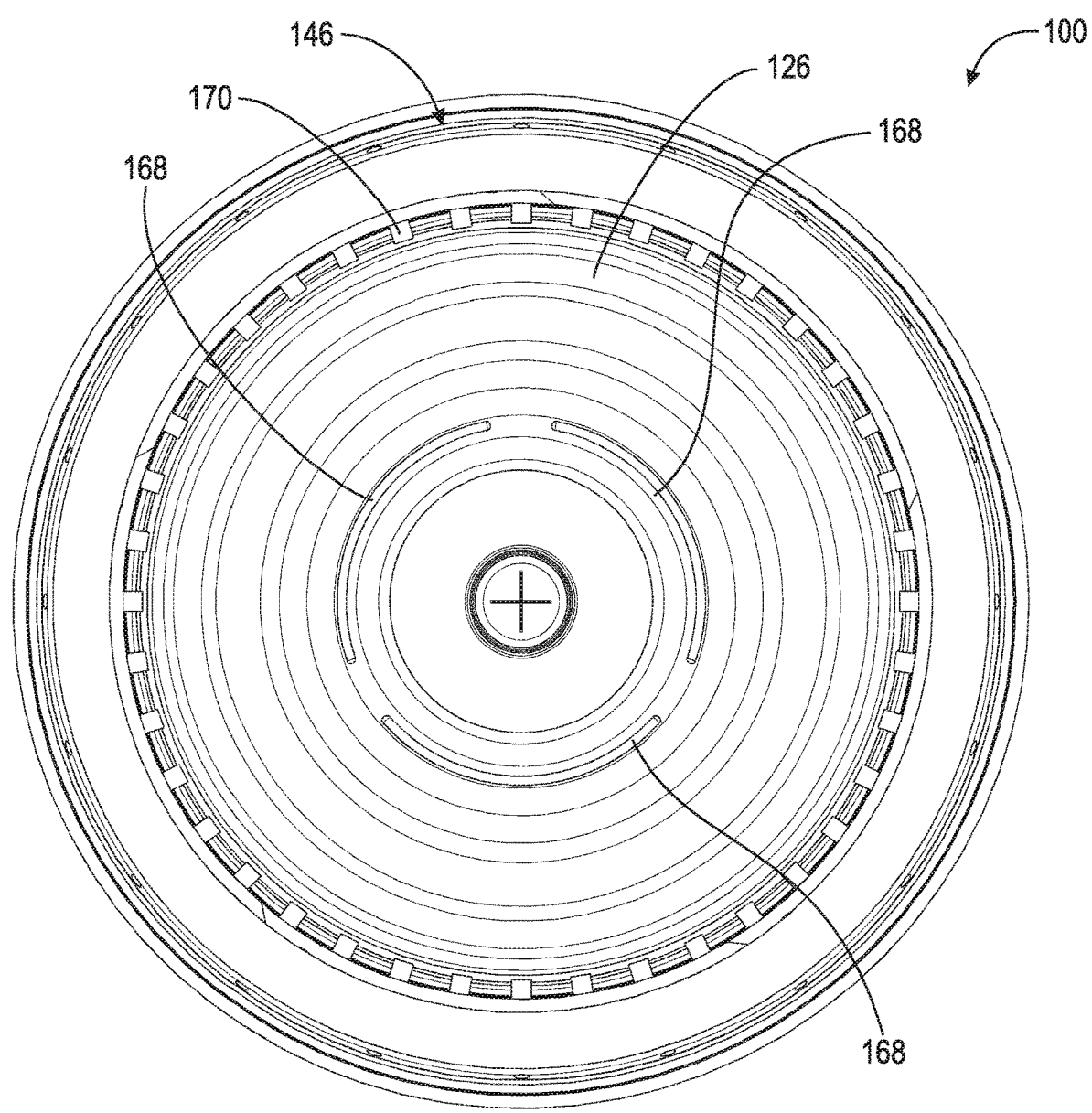
FIG. 7 is a back view of a dam plate, the clutch plate, the piston plate, and the cover of the torque converter shown in FIG. 1.

FIG. 7 is a back view of dam plate 126, clutch plate 146, piston plate 124, and cover 104 of torque converter 100 shown in FIG. 1. The following should be viewed in light of FIGS. 1 through 7. Centering plate 128 includes protrusions 154 extending from side 150 in axial direction AD1. In the example of FIG. 1, plate 128 includes three protrusions 154. In FIG. 4, walls 156 of protrusions 154, forming portions of protrusions 154 extending furthest in direction AD1 are stippled to clarify perspective. Each channel 134 passes between two respective circumferentially adjacent protrusions 154.

Turning to FIGS. 5 and 6, centering plate 128 includes indentations 158 formed by protrusions 154. For example, walls 156 bound portions of indentations 158. Indentations 158 extend from side 152 in direction AD1. Side 152 is stippled in FIGS. 5 and 6 to help clarify presentation. Centering plate 128 includes slots 160 in fluid communication with respective indentations 158. Slots 160 include ends 162 at indentations 158 and ends 164 at chamber 132. Protrusions 154 and slots 160 are interleaved in circumferential direction CD1. That is, protrusions 154 and slots 160 are sequentially aligned in direction CD1.

In an example embodiment, respective portions of channels 134 and 136 are sequentially aligned in circumferential direction CD1. For example channels 134 and 136 are interleaved in direction CD1, and circle C, centered on axis of rotation AR of torque converter 100, passes through channels 134 and 136.

Centering plate 128 is fixed to cover 104. In an example embodiment, welds 166 fixedly connect plate 128, for example protrusions 154, to cover 104 and seal walls 156 to cover 104. For example, each weld 166 forms a continuous line on or about a wall 156. Centering plate 128, for example wall 152, is fixedly connected to dam plate 126. In an example embodiment, welds 168 fix centering plate 128 to dam plate 126 and seal side 152 to dam plate 126. For example, welds 168 seal portions of side 152 circumferentially between slots 160. In FIG. 6, welds 168 are stippled to contrast with side 152.

In an example embodiment clutch plate 146 includes tabs 170 interleaved with tabs 172 of input plate 138 to non-rotatably connect clutch plate 146 with input plate 138 and cover plate 144.

Radially innermost portion 174 of dam plate 126 is arranged to seal against the input shaft of the transmission. Radially innermost portion 176 of centering plate 128 is arranged to seal against the input shaft. Radially innermost end 178 of channel 136 is between portions 174 and 176. Radially innermost end 180 of channel 134 is between cover 104 and portion 176. Radially innermost end 180 is axially disposed between cover 104 and radially innermost end 178. Channel 134 includes radially outermost end 182 at chamber 130 and channel 136 includes radially outermost end 184 at chamber 132. In an example embodiment, end 182 is axially disposed between cover 104 and end 184.

In an example embodiment, dam plate 126 is free of a through-bore passing through dam plate 126 and wholly surrounded by material M1 forming dam plate 126, with an exception of central opening 186 of dam plate 126 through which axis of rotation AR passes. For example, dam plate 126 is a continuous unbroken surface radially outwardly from portion 174. In an example embodiment, centering plate 128 is free of a through-bore passing through centering plate 128 and wholly surrounded by material M2 forming centering plate 128, with an exception of central opening 188 of centering plate 128 through which axis of rotation AR passes. For example, centering plate 128 is a continuous unbroken surface radially outwardly from portion 176.

In an example embodiment, pressurized fluid PF2 is transmitted to chamber 132 to dynamically balance torque converter 100, in particular to dynamically balance fluid PF1 in chamber 130.

Channels 134 and 136 form separate fluid circuits in torque converter 100. Pressurized fluid PF1 and PF2 are transmitted through respective separate channels in the input shaft to channels 134 and 136. In the example of FIG. 1, torque converter 100 is a four-pass, or four fluid circuit, torque converter and pressurized fluid PF3 and PF4 are transmitted through respective separate channels in the input shaft to chamber 190 and torus 192. Chamber 190 is bounded at least in part by cover 104, dam plate 126, and turbine shell 118.

Piston plate 124 rest on radially outer portion 194 of centering plate 128 and is radially centered by centering plate 128. In an example embodiment, seals S1 and S2 seal piston 124 against centering plate 128 and retaining plate 196, fixed to cover 104, respectively. Seals S1 and S2 hydraulically isolate chamber 130 from chambers 132 and 190. In an example embodiment, seal S3 seals dam plate 126 against piston plate 124 and hydraulically isolates chamber 132 from chamber 190. Seals S1, S2, and S3 enable axial displacement of piston plate 124 while maintaining the hydraulic isolation of chambers 130 and 132.

The following should be viewed in light of FIGS. 1 through 7. The following describes a method of operating a lock-up clutch for a torque converter. The torque converter includes: a cover; an impeller including an impeller shell fixed to the cover and at least one impeller blade fixed to the impeller shell; a turbine including a turbine shell and at least one turbine blade fixed to the turbine shell; a stator including at least one stator blade axially disposed between the impeller shell and the turbine shell; and a torsional vibration damper arranged to be non-rotatably connected to an input shaft of a transmission. A first step receives torque on the cover. A second step transmits a first pressurized fluid radially outwardly through a first channel bounded at least in part by the cover and a first side of a centering plate non-rotatably connected to the cover, the first side facing in a first axial direction. A third step transmits the first pressurized fluid into a first chamber bounded at least in part by the cover and a piston plate of a lockup clutch of the torque converter. A fourth step transmits a second pressurized fluid radially outwardly through a second channel between a second side of the centering plate and a dam plate non-rotatably connected to the centering plate, the second side facing in a second axial direction opposite the first axial direction. A fifth step transmits the second pressurized fluid into a second chamber bounded at least in part by the piston plate and the dam plate. A sixth step displaces, with the first pressurized fluid, the piston plate in the second axial direction. A seventh step non-rotatably connects the piston plate to an input plate of the torsional vibration damper.

Transmitting the first pressurized fluid radially outwardly through the first channel includes precluding transmission of the first pressurized fluid to the first chamber through a through-bore passing through the dam plate, or through a through-bore passing through the centering plate.

Transmitting the second pressurized fluid radially outwardly through the second channel includes precluding transmission of the second pressurized fluid to the second chamber through a through-bore passing through the dam plate, or through a through-bore passing through the centering plate.

Transmitting the first pressurized fluid radially outwardly through the first channel includes transmitting the first pressurized fluid through a radially innermost end of the first channel axially disposed between the cover and a radially innermost end of the second channel. Transmitting the first pressurized fluid radially outwardly through the first channel includes transmitting the first pressurized fluid through an end of the first channel at the first chamber and axially disposed between the cover and an end of the second channel at the second chamber.

Transmitting the first pressurized fluid radially outwardly through the first channel includes transmitting the first pressurized fluid through a segment of the first channel sequentially aligned in a circumferential direction with the second channel.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
C circle
CD1 circumferential direction
F force
M1 material
M2 material
PF1 pressurized fluid
PF2 pressurized fluid
PF3 pressurized fluid
PF4 pressurized fluid
R rivet
S1 seal
S2 seal
S3 seal
100 torque converter
102 lockup clutch
104 cover
106 impeller
108 turbine
110 stator
112 component
114 impeller shell
116 impeller blade
118 turbine shell
120 turbine blade
122 stator blade 124 piston plate
126 dam plate
128 centering plate
130 chamber
132 chamber
134 channel
136 channel
138 input plate, damper
140 output flange, damper
142 spring, damper
144 cover plate, damper
146 clutch plate
147 reaction plate
148 leaf spring
149 resilient element
150 side, centering plate
152 side, centering plate
154 protrusion, centering plate
156 wall, protrusion
158 indentation
160 slot
162 end, slot
164 end, slot
166 weld
168 weld
170 tab, clutch plate
172 tab, input plate
174 portion, dam plate
176 portion, centering plate
178 radially innermost end, channel 136
180 radially innermost end, channel 134
182 end, channel 134
184 end, channel 136
186 central opening, dam plate
188 central opening, centering plate
190 chamber
192 torus
194 radially outer portion, centering plate
196 retaining plate

The invention claimed is:
1. A torque converter, comprising:
a cover arranged to receive torque;
an impeller including an impeller shell fixed to the cover, and at least one impeller blade fixed to the impeller shell;
a turbine including a turbine shell, and at least one turbine blade fixed to the turbine shell;
a stator including at least one stator blade axially disposed between the impeller shell and the turbine shell; and,
a lock-up clutch including:
a piston plate non-rotatably connected to the cover;
a dam plate;
a centering plate axially disposed between the cover and the dam plate;
a first chamber bounded at least in part by the cover and the piston plate;
a second chamber bounded at least in part by the piston plate and the dam plate;
a first channel connected to the first chamber and bounded at least in part by the cover and the centering plate; and,
at least one second channel connected to the second chamber, the at least one second channel including a radially innermost end bounded at least in part by the dam plate and a radially innermost end of the centering plate.

2. The torque converter of claim 1, further comprising:
a torsional vibration damper including:
an input plate;
an output flange arranged to be non-rotatably connected to an input shaft of a transmission; and,
at least one spring engaged with the input plate and the output flange, wherein the first channel is arranged to transmit pressurized fluid to the first chamber to axially displace the piston plate to non-rotatably connect the piston plate and the input plate of the torsional vibration damper.
3. The torque converter of claim 1, wherein:
the centering plate includes a first side, at least a portion of which is facing in a first axial direction, and a second side, at least a portion of which is facing in a second axial direction, opposite the first axial direction;
the first axial direction is from the at least one impeller blade toward the at least one turbine blade; and,
no portion of the second channel is bounded by the first side of the centering plate, and no portion of the first channel is bounded by the second side of the centering plate.
4. The torque converter of claim 1, wherein a portion of the first channel and a portion of the second channel are sequentially aligned in a circumferential direction.
5. The torque converter of claim 1, wherein:
the first channel includes a radially innermost end and a radially outermost end;
the at least one second channel includes a radially outermost end;
the radially innermost end of the first chamber is axially disposed between the cover and the radially innermost end of the second chamber; and,
the radially outermost end of the first channel is axially disposed between the cover and the radially outermost end of the at least one second channel.
6. The torque converter of claim 1, wherein:
the centering plate includes a first protrusion extending from a wall of the centering plate in an axial direction and a second protrusion extending from the wall of the centering plate in the axial direction; and,
the first channel passes between the first protrusion and the second protrusion.
7. The torque converter of claim 6, wherein the cover is fixedly connected to the first protrusion and the second protrusion.
8. The torque converter of claim 6, wherein the first protrusion and the second protrusion are sequentially aligned in a circumferential direction.
9. The torque converter of claim 6, wherein the first protrusion and the second protrusion are sealed to the cover.
10. The torque converter of claim 1, wherein:
the centering plate includes an indentation extending from a wall of the centering plate in an axial direction, and a slot opening to the indentation; and,
the second channel passes through the slot.
11. The torque converter of claim 10, wherein the dam plate is fixedly connected to the wall.
12. The torque converter of claim 1, wherein:
the centering plate includes a plurality of indentations extending from a wall of the centering plate in an axial direction;
the centering plate includes a respective slot opening to each indentation of the plurality of indentations;
the at least one second channel includes a plurality of second channels, and a respective second channel passes through the respective slot; and, the wall is sealed to the dam plate circumferentially between the respective slots.

13. The torque converter of claim 1, wherein:
the dam plate is free of a through-bore passing through the dam plate with an exception of a central opening of the dam plate through which an axis of rotation for the torque converter passes; and,
the centering plate is free of a through-bore passing through the centering plate with an exception of a central opening of the centering plate through which an axis of rotation for the torque converter passes.

14. A torque converter, comprising:
a cover arranged to receive torque;
an impeller including an impeller shell fixed to the cover, and at least one impeller blade fixed to the impeller shell;
a turbine including a turbine shell, and at least one turbine blade fixed to the turbine shell;
a stator including at least one stator blade axially disposed between the impeller shell and the turbine shell;
a torsional vibration damper arranged to be non-rotatably connected to an input shaft of a transmission, and including an input plate; and,
a lock-up clutch including:
  a piston plate non-rotatably connected to the cover;
  a dam plate free of a through-bore passing through the dam plate with an exception of a central opening of the dam plate through which an axis of rotation of the torque converter passes;
  a centering plate axially disposed between the cover and the dam plate, and, with an exception of a central opening of the centering plate through which an axis of rotation of the torque converter passes, free of a through-bore passing through the centering plate;
  a first chamber bounded at least in part by the cover and the piston plate;
  a second chamber bounded at least in part by the piston plate and the dam plate;
  a first channel connected to the first chamber and bounded at least in part by the cover and a first side of the centering plate; and,
  a second channel connected to the second chamber and bounded at least in part by the dam plate and a second side of the centering plate, wherein the first channel is arranged to transmit first pressurized fluid to the first chamber to axially displace the piston plate to non-rotatably connect the piston plate and the input plate of the torsional vibration damper.

15. The torque converter of claim 14, wherein:
a portion of the first channel and a portion of the second channel are sequentially aligned in a circumferential direction;
the centering plate includes a first protrusion extending from a wall of the centering plate in an axial direction and a second protrusion extending from the wall of the centering plate in the axial direction; and,
the first channel passes between the first protrusion and the second protrusion.

16. The torque converter of claim 14, wherein:
the centering plate includes an indentation extending from a wall of the centering plate in an axial direction, and a slot opening to the indentation; and,
the second channel passes through the slot.

* * * * *